னch# 3,088,914
FIRE-RESISTANT HYDRAULIC FLUIDS
Rudolf J. Holzinger, North Merrick, N.Y., assignor to Socony Mobil Oil Company, Inc., a corporation of New York
No Drawing. Filed Mar. 31, 1960, Ser. No. 18,841
4 Claims. (Cl. 252—76)

This invention relates to an improved composition for use in hydraulic systems and is particularly concerned with an improved water-in-oil emulsion useful as a fire-resistant hydraulic oil.

Hydraulic systems are being employed more and more extensively in industry to operate machinery from remote locations and with comparative ease. Various types of liquids have been employed as the operative fluid in these hydraulic systems; however, for one reason or another, these liquids have been found to lack required properties. Various oils, such as mineral oils, have found much favor in the past; however, many applications of hydraulic systems cannot tolerate leaks with such a pressure transmitting medium since the oil, under high pressure, may then find its way to heat and flame where explosion or combustion occurs. Hydraulic systems are used in metalworking and treating plants and leaks in the system have caused serious accidents in the past.

Water-in-oil emulsions have been tried in the prior art to provide a useful hydraulic oil that had the benefit of poor flammability. While the emulsion remains unbroken with the water uniformly dispersed throughout the oil in the form of fine particles, the fire resistance is high but adequate stability of the emulsion has not been present in prior formulations. The water particles tend to agglomerate in clusters and to settle to the lower part of the reservoir, thereby impairing the fire resistance of the fluid remaining in the upper part. In some cases, an upper layer of clear oil possessing no fire resistance whatsoever will result. In more severe cases, the water may coalesce into larger droplets which eventually will settle out and form a layer of free water on the bottom. In addition to impairment of fire resistance the latter condition is objectionable in that free water may enter the circulating system and may cause corrosion of lines and working parts and rapid wear of pump parts due to lack of lubrication.

An object of this invention is to provide an improved composition for use as a hydraulic oil.

An additional object of this invention is to provide an improved composition having fire-resisting properties for use as a hydraulic oil.

An additional object of this invention is to provide an improved stable water-in-oil emulsion having fire-resisting properties for use as a hydraulic oil.

These and other important objects will be made apparent in the ensuing detailed discussion of this invention.

I have found that a stable, fire-resistant water-in-oil emulsion of low viscosity can be obtained by emulsifying up to 50 percent water with an oil, using calcium sulfonate as the basic emulsifier and further using a combination of selected calcium salts of aliphatic acids and selected calcium salts of naphthenic acids as a stabilized medium. The salts or soaps of other metals, such as barium, magnesium, strontium, manganese, zinc, aluminum, cadmium, tin, chromium and cobalt, may also be used although calcium is preferred.

The oil used may be any suitable hydrocarbon oil of viscosity range from about 50–400 Saybolt Universal seconds at 100° F. It has been found, however, that a white oil in that viscosity range provides unusually good results when using the emulsifying and stabilizing agents disclosed hereinafter. This is a completely unexpected result since the rigorous refining required to produce white oils is generally conceded to remove natural inhibitors and reduce lubricity. However, when a white oil is used as the base oil of the emulsion of this invention, improved oxidation resistance and improved emulsion stability are obtained. This can readily be demonstrated by making a suitable oxidation test on the emulsion using a naphthenic base oil, a paraffinic base oil and a white oil as the base oil. The test comprises primarily submitting four different metals to submersion in the oil for 40 hours at 210° F. while air or oxygen saturated with water vapor is bubbled through the test bath. The naphthenic oil clearly shows signs of poor oxidation stability while the paraffin oil clearly shows signs of poor emulsion stability. On the contrary, the emulsion made using white oil as the base oil shows good oxidation and good emulsion stability. This is clearly a result that could not be predicted from prior knowledge.

The calcium sulfonate used as the basic emulsifier may be present in the blend in the amount of about .25–2.50 percent by weight of the total blend but preferably about .3–1.0 percent by weight can be used to provide entirely satisfactory results. The calcium sulfonate, while primarily an emulsifying agent, supplies a certain amount of anti-corrosive action and anti-wear protection. The calcium sulfonate should have a molecular weight of at least about 900. When the calcium sulfonate has a molecular weight of about 1000 the emulsification is excellent.

It is found that the emulsion will gradually deteriorate when calcium sulfonate is used alone and hence the mixture of calcium sulfonate and oil alone as a hydraulic oil is not satisfactory. However, unusually stable emulsions are found to occur when the calcium salts of naphthenic acids are used as a stabilizing medium. The molecular weight of the naphthenic acid is found to be critical, naphthenic acids of molecular weight less than 315 being found to possess little or no stabilizing action. In fact, in many cases, acids below the critical limit of molecular weight act as emulsion breakers. Particularly useful in this invention are napththenic acids of about 315–1000 molecular weight. A preferred range of molecular weight of naphthenic acids is 315–500. Outstanding results are obtained with naphthenic acids identified as Sunaptic B and Sunaptic C. The B acid has a molecular weight of 325 whereas the C acid has a molecular weight of 415. The Sunaptic acid can be obtained from the Sun Oil Company of Philadelphia, Pennsylvania.

The emulsion can also be stabilized by adding the calcium salts of aliphatic acids (both saturated and unsaturated) as a stabilizing medium. The length of the acid chain is found to be critical, acids having a chain length of $C_{18}$ or less being found to possess little or no stabilizing action when used as the sole stabilizer. Particularly useful are aliphatic acids (saturated or unsaturated) of a chain length of broadly about $C_{16}$–$C_{30}$ and preferably about $C_{18}$–$C_{22}$. Outstanding results are obtained with behenic acid ($C_{22}$). Outstanding results can also be obtained with erucic acid (unsaturated $C_{22}$ acid).

When the two stabilizing materials described above are used simultaneously improved results are obtained since these materials show a synergistic action in this environment. The calcium salts of aliphatic acids of a carbon chain length broadly about $C_{16}$–$C_{30}$ and preferably about $C_{18}$–$C_{22}$ work synergistically with the calcium salts of naphthenic acids of molecular weight about 315–1000 and preferably 315–500 to provide an unusually stable and preferred hydraulic fluid. The two agents may be combined in any proportion to provide a combined stabilizing agent. Each agent should broadly vary between about .10 to 2.50 by weight and preferably about 0.2 to 1.0 by weight of the finished blend. Excellent results are obtained by using equal amounts by weight of the calcium salt of behenic acid and the calcium salt of Sunaptic C, although unequal amounts may be successfully used.

While stability of the emulsion is an important feature, it is also highly desirable to control its viscosity. If the emulsion is too viscous, it may not function in some hydraulic machinery. This is especially important at ambient temperature, e.g. at start-up. If the emulsion is too viscous, it may fail to flow properly under the suction provided by the pump. In such a case, the pump would not be provided with an adequate volume of fluid and cavitation would occur, with the possibility of damage to the working parts of the pump. Therefore, it is desirable to hold the viscosity of the emulsion within certain limits. In applications such as here contemplated, it is frequently desired to hold the viscosity below 400 S.U.S. at 100° F. or preferably at or below 350 S.U.S. at 100° F.

I have found that emulsions of suitable viscosity characteristics can be prepared by using calcium sulfonate in combination with both the calcium soaps of selected naphthenic acids, such as the naphthenic acids described above, and the calcium soaps of certain fatty acids. The fatty acid may have a chain length of from about 16 to about 30 carbon atoms.

Many emulsions used in industry are maintained in a stable state by means of high viscosity which interferes with separation of the oil and/or water phases. The more fluid the preparation, the more difficult it becomes to preserve the initial state of the emulsion. Therefore, it is exceedingly valuable to be able to produce an emulsion that exhibits both features, i.e. high stability and low viscosity. This is particularly true when stability at high temperatures while maintaining low viscosity is desired. In this respect, the calcium salts of aliphatic acids (saturated or unsaturated) of a chain length of broadly about $C_{16}-C_{30}$ and preferably about $C_{18}-C_{22}$ are again outstanding.

In order to insure adequate fire protection, a sufficient amount of water must be properly emulsified into the oil. The water may range from about 10–50 percent of the water-in-oil emulsion; however, a fully acceptable emulsion having excellent fire-resisting properties is obtained when the water is about 10–40 percent of the water-in-oil emulsion.

In preparing the emulsions of this invention it has been found advantageous to form the calcium soap in situ. Thus, a preferred method of preparation calls for dissolving or dispersing the lime in the water and mixing the solution or dispersion rapidly with the oil containing the calcium sulfonate and aliphatic acid with high-speed agitation. Generally, the water phase is added to the oil phase, although in some cases the opposite method may be preferred. The resultant emulsion may be subjected to further mechanical treatment such as passing it through a colloid mill or homogenizer. A suitable method of preparation is as follows: The calcium sulfonate, the aliphatic acid and the naphthenic acid are dissolved in the oil and the mixture is heated to 175±5° F. the water is heated to 175±5° F. and the lime, after being added to the water, is kept in dispersion by mild agitation. The water phase is then added to the oil phase under vigorous agitation, using a high-speed mixer, followed, if necessary, by further mechanical treatment such as passing the emulsion through a colloid mill or homogenizer. In some cases, it may be desirable to also form the calcium sulfonate in situ. In this instance, all three acids, namely, the sulfonic acid, the aliphatic acid and the naphthenic acid, are dissolved in the oil, with the subsequent steps remaining substantially unchanged.

It is desirable and in many cases essential that the amount of lime to be used in preparing these emulsions be sufficient to form the basic soaps of the alphatic and naphthenic acids and also, if a neutral calcium sulfonate is used, to convert the latter to the basic sulfonate. Frequently, it is desirable to employ an amount of lime in excess of the stoichiometric ratio necessary to produce both the basic soaps and the basic sulfonate. This excess may, for instance, amount to 50 percent above the stoichiometric ratio and may be as much as 100 percent or more.

Rating of emulsion stability may be done visually either at room temperature or after storage at elevated temperature, e.g., 170° F. A convenient method consists of storing the emulsions in 100 ml. graduated cylinders so that the volume of oil or water separated may be read directly as percent of total volume. Obviously, it is desirable to keep separation of oil and water to a minimum. Separation of water is particularly objectionable since it indicates coalescence of the dispersed phase.

The examples given in Table I, shown below, demonstrate the magnitude of improvement brought about by this invention.

*Table I*

[Parts by weight]

| Examples | 1 | 2 | 3 | 4 | 5 | 6 | 7 | 8[1] |
|---|---|---|---|---|---|---|---|---|
| Nut. Calcium Sulfonate, 1,000 M.Wt.—100+ Active | 1.0 | 0.5 | 0.5 | 0.5 | 0.5 | 0.5 | 0.5 | 0.5 |
| Stearic Acid | | 0.5 | | | | 0.25 | | |
| Behenic Acid | | | 0.5 | | | | 0.25 | 0.25 |
| Naphthenic Acid—295 M. Wt. | | | | 0.5 | | | | |
| Naphthenic Acid—415 M. Wt. | | | | | 0.5 | 0.25 | 0.25 | 0.25 |
| 140″ U.S.P. White Oil | 18.5 | 18.5 | 18.5 | 18.5 | 18.5 | 18.5 | 18.5 | 18.5 |
| 90″ U.S.P. White Oil | 40.0 | 40.0 | 40.0 | 40.0 | 40.0 | 40.0 | 40.0 | 40.0 |
| Antioxidant | 0.5 | 0.5 | 0.5 | 0.5 | 0.5 | 0.5 | 0.5 | 0.5 |
| Lime | 0.16 | 0.2 | 0.2 | 0.2 | 0.2 | 0.2 | 0.2 | 0.2 |
| Water | 40.0 | 40.0 | 40.0 | 40.0 | 40.0 | 40.0 | 40.0 | 40.0 |
| Viscosity, S.U.S. @ 100° F | 337 | 481 | 486 | 357 | 354 | 345 | 343 | 315 |
| Storage Stability: | | | | | | | | |
| 7 days @ 170° F.—Separation: | | | | | | | | |
| Oil, Percent | 20 | 40 | 21 | (2) | 7 | 22 | 5 | 5 |
| Water, Percent | 17 | 2 | 0 | (2) | <1 | 2 | <1 | <1 |
| 7 days @ 200° F.—Separation: | | | | | | | | |
| Oil, Percent | (2) | 55 | 25 | (2) | 20 | 41 | 8 | 8 |
| Water, Percent | (2) | 32 | 12 | (2) | 12 | 9 | 3 | 3 |

[1] Homogenized @ 4500 p.s.i.
[2] Complete separation.

In comparing Examples Nos. 1 and 2, it is noted that the use of calcium stearate in conjunction with calcium sulfonate has raised the viscosity from 337 to 481 S.U.S. at 100° F., an increase of 144 seconds, although stability is somewhat improved. A similar viscosity increase is shown in the case of Example 3, using behenic acid, although stability at elevated temperature shows a very marked improvement over 1. Examples Nos. 4 and 5 indicate the effects obtained when naphthenic acids are substituted for aliphatic acids. Naphthenic acid, with a molecular weight of 295 which is somewhat above the molecular weight of conventional naphthenic acids (Example 4), yields an acceptable viscosity, but the emulsion is unstable. In contrast, Example 5 shows the naphthenic acid with a molecular weight of 415, while yielding a similar viscosity, provides a product of substantial heat stability.

Examples 6 through 8 indicate the unusual improvements brought about when calcium sulfonate is used in conjunction with two stabilizers, one the calcium salt of an aliphatic acid, the other the calcium salt of a suitable naphthenic acid (e.g. molecular weight 415). In Example No. 6, using stearic acid, a viscosity below 350 seconds is obtained, and stability at 170° F. is quite good although at 200° F. the product still exhibits deficiencies. A radical further improvement in stability is brought about when behenic acid is substituted for stearic acid, as indicated in Example 7. Combined separation of water and oil, both at 170° F. and 200° F., amounts to less than 12% of total volume while the emulsion retains essentially the same viscosity. Such stability is particularly noteworthy at 200° F. since this temperature approaches the boiling point of water, an essential constituent of the emulsion.

Example 8 is identical with Example 7 with respect to composition, but differs in the method of mechanical treatment. Ordinarily, homogenizing treatment tends to reduce particle size of the dispersed phase which in turn increases the viscosity of the emulsion. It is surprising, therefore, that homogenizing brings about a further reduction in viscosity without affecting the stability of this composition.

The detailed description of the invention given hereinabove and the examples supplied are not intended to limit the scope of this invention. The only limitations intended are those found in the claims attached hereto.

I claim:

1. A composition for use as hydraulic fluid consisting essentially of a water-in-oil emulsion containing about 0.25–2.50 percent by weight of oil-soluble calcium petroleum sulfonate having a molecular weight of at least 900 as an emulsifying agent and about 0.1–2.50 percent by weight of calcium salts of aliphatic acids having carbon chain length of about $C_{16}$–$C_{30}$ and about 0.1–2.50 percent by weight of calcium salts of naphthenic acids having molecular weights of about 315–1000, the oil portion of said emulsion being a hydrocarbon oil having a viscosity range of about 50–400 Saybolt Universal seconds at 100° F.

2. A composition for use as hydraulic fluid consisting essentially of water-in-oil emulsion in which about 10–50 percent by weight of the mixture is water uniformly distributed in fine particle form and containing about 0.25–2.50 percent by weight of oil-soluble calcium petroleum sulfonate having a molecular weight of at least 900 as an emulsifying agent and about 0.1–2.50 percent by weight of calcium salts of aliphatic acids having carbon chains of about $C_{16}$–$C_{30}$ and about 0.1–2.50 percent by weight of calcium salts of naphthenic acids having molecular weights of about 315–1000, as a combined stabilizing medium, whereby the emulsion is retained with the water particles in fine particle form and uniformly distributed throughout the mixture, the oil portion of said emulsion being a hydrocarbon oil having a viscosity range of about 50–400 Saybolt Universal seconds at 100° F.

3. A composition for use as hydraulic fluid consisting essentially of a water-in-oil emulsion in which about 10–40 percent by weight of the mixture is water uniformly distributed in fine particle form and containing about 0.25–2.50 percent by weight of oil-soluble calcium petroleum sulfonate having a molecular weight of at least 900 as an emulsifying agent and a mixture of 0.2–1.0 percent by weight of the calcium salts of aliphatic acids having carbon chains of about $C_{18}$–$C_{22}$ with 0.2–1.0 percent by weight of the calcium salts of naphthenic acids having molecular weights of about 315–500 as a stabilizing medium, the oil portion of said emulsion being a hydrocarbon oil having a viscosity range of about 50–400 Saybolt Universal seconds at 100° F., whereby the emulsion is retained with the water particles in fine dispersion in the oil.

4. A composition for use as hydraulic fluid consisting essentially of a water-in-oil emulsion in which about 10–40 percent by weight of the mixture is water uniformly distributed in fine particle form, the oil is a white oil having a viscosity of about 50–400 Saybolt Universal seconds at 100° F. and the mixture contains about 0.3–1.0 percent by weight of oil-soluble calcium petroleum sulfonate having a molecular weight of at least 900 as an emulsifying agent and a mixture of about 0.2–1.0 percent by weight of a mixture of the calcium salt of behenic acid in nearly equal proportion with 0.2–1.0 percent by weight of calcium salt of a naphthenic acid having a molecular weight of 415, as a stabilizing medium, whereby the emulsion is retained with the water particles in fine dispersion in the oil.

References Cited in the file of this patent

UNITED STATES PATENTS

| | | |
|---|---|---|
| 2,632,734 | Nunn | Mar. 24, 1953 |
| 2,744,870 | Stillebroer | May 8, 1956 |
| 2,820,007 | Van Der Minne et al. | Jan. 14, 1958 |
| 2,856,362 | Morway | Oct. 14, 1958 |
| 2,907,714 | Francis et al. | Oct. 6, 1959 |
| 2,927,079 | Jense et al. | Mar. 1, 1960 |
| 2,961,404 | Francis | Nov. 22, 1960 |
| 3,019,190 | Holzinger | Jan. 30, 1962 |